United States Patent [19]

Murakami et al.

[11] Patent Number: 4,930,909

[45] Date of Patent: Jun. 5, 1990

[54] ROLLING BEARING

[75] Inventors: Yasuo Murakami, Yamato; Youichi Matsumoto; Kazuhiro Uemura, both of Fujisawa, all of Japan

[73] Assignee: Nippon Seiko Kabushiki Kaisha, Tokyo, Japan

[21] Appl. No.: 376,864

[22] Filed: Jul. 7, 1989

[30] Foreign Application Priority Data

Jul. 11, 1988 [JP] Japan .................. 63-172030

[51] Int. Cl.$^5$ ............... F16C 33/62; C21D 9/38; C21D 9/40
[52] U.S. Cl. ............... 384/492; 384/625; 384/912; 384/913; 148/318; 148/319
[58] Field of Search ............... 384/492, 625, 912, 913; 148/318, 319, 16.5, 16.6; 428/610, 627

[56] References Cited

U.S. PATENT DOCUMENTS

| 3,117,041 | 1/1964 | Koistinen ............... 148/333 |
| 3,275,389 | 9/1966 | Neilson et al. ............... 384/95 |
| 3,734,582 | 5/1973 | Beauchet ............... 384/492 |
| 3,929,523 | 12/1975 | Kinoshi et al. ............... 148/16.5 |
| 3,954,517 | 5/1976 | Jatczak et al. ............... 148/16.5 |
| 4,004,952 | 1/1977 | Jatczak et al. ............... 148/319 |
| 4,023,988 | 5/1977 | Stickels et al. ............... 148/12.4 |
| 4,191,599 | 3/1980 | Stickels et al. ............... 148/16.5 |
| 4,232,436 | 11/1980 | Chmura ............... 384/625 |
| 4,358,317 | 11/1982 | Abe ............... 148/319 |
| 4,470,854 | 9/1984 | Nakamura ............... 148/318 |
| 4,659,241 | 4/1987 | Bamberger et al. ............... 384/912 |
| 4,773,947 | 9/1988 | Shibata et al. ............... 148/16.5 |

FOREIGN PATENT DOCUMENTS

| 2333183 | 4/1974 | Fed. Rep. of Germany ..... 148/16.6 |
| 52-4415 | 1/1977 | Japan ............... 148/318 |
| 54-128448 | 10/1979 | Japan ............... 148/16.6 |
| 57-94516 | 6/1982 | Japan ............... 148/16.5 |
| 58-71357 | 4/1983 | Japan ............... 148/318 |
| 58-71368 | 4/1983 | Japan ............... 148/318 |
| 58-130219 | 8/1983 | Japan ............... 148/16.6 |
| 58-130255 | 8/1983 | Japan ............... 148/318 |
| 58-171558 | 10/1983 | Japan ............... 148/318 |
| 59-16948 | 1/1984 | Japan ............... 148/318 |
| 59-16949 | 1/1984 | Japan ............... 148/318 |
| 59-16950 | 1/1984 | Japan ............... 148/318 |
| 857308 | 9/1958 | United Kingdom ............... 384/625 |

Primary Examiner—John J. Zimmerman
Attorney, Agent, or Firm—Basile and Hanlon

[57] ABSTRACT

A rolling bearing having an inner ring, outer ring and rolling element, at least one of these elements being made of one of the following first, second or third medium-carbon manganese steels. The first medium-carbon manganese steel includes C: 0.4 to 0.7 wt. %, Si: 0.15 to 1.2 wt. %, Mn: 1.2 to 1.7 wt. %, Al: 200 to 300 ppm, Ti: up to 40 ppm, N: 100 to 200 ppm, S: up to 80 ppm, O: 9 ppm and the balance of Fe. The second steel includes at least one of Nb: 0.03 to 0.08 wt. % and V: 0.1 to 0.15 wt. % in addition to the elements of the first medium-carbon manganese steel. The third medium-carbon manganese steel includes at least one of Nb: 0.03 to 0.08 wt. % and V: 0.1 to 0.15 wt. % instead of Al and N and includes the other elements of the first medium-carbon manganese steel. Each medium-carbon manganese steel is subject to carburizing or carbo-nitriding so as to include a case with a 25 to 45 vol. % retained austenite.

6 Claims, 6 Drawing Sheets

ROLLING BEARING

CROSS-REFERENCE TO CO-PENDING RELATED APPLICATIONS

This invention relates to co-pending applications Ser. Nos. 143,389, and 225,899, filed January 13, 1988 and July 29, 1989, respectively, by the named inventors.

BACKGROUND OF THE INVENTION

1. Field of the Invention

The present invention relates to rolling bearings used with automotive vehicles, argicultural machinery, construction machines, machines relating to the iron and steel industry, and the like. The present invention relates more particularly to long-life rolling bearings required for use in a vehicle transmission and a vehicle engine.

2. Description of the Related Art

Heretofore, a rolling bearing with a long rolling contact fatigue life (hereinafter, also referred to as a life) which is required for use in an automotive vehicle and used under a high bearing employs low-carbon case hardened steels with a good hardenability, such as SCR420H, SCM420H, SAE8620H and SAE4320H, because a hardness transition curve must be determined in order to match an internal shearing stress distribution caused by a contact surface pressure. These low-carbon case hardened steels are subject to carburizing or carbonitriding in order to increase the hardness of the overall rolling bearing so that the surface hardnesses of inner and outer rings, and rolling elements of the rolling bearing are HRC of 58 to 64 and the core hardnesses thereof are HRC of 30 to 48.

U.S. Pat. No. 4,191,599 discloses a first prior-art long-life rolling bearing in which a high-carbon alloy steel is heated under a carburizing atmosphere so that the Ms point of the surface of the high-carbon alloy steel is lower than that of the core thereof, and then quenched to transform in the form of thermal stress so that a residual compressive stress remains in the surface of the resulting high-carbon alloy steel.

U.S. Pat. No. 4,023,988 discloses a second prior-art long-life rolling bearing employing a hot forming low-alloy steel, an alloying element of which is selected from the group of C: 0.6 to 1.5 wt. %, Cr, Mn, Ni, Cu and Mo and further including a refined carbide.

In addition, the copending U.S. patent applications Ser. Nos. 225,899 and 143,389 of the present inventors relate to the present patent application.

In the above-mentioned prior-art, for case hardened steels SCR420H etc., used when a carburized-and-hardened layer or case is designed to be deeper, a carburizing process must be carried out at a high temperature for a long time because the amount of base carbon is low. Thus the productivity of the heat treatment is low. On the other hand, when the amount of surface carbon is high, a pro-eutectoid cementite tends to easily appear because the content of Cr of case hardened steel SCR420H is high, so that the rolling contact fatigue life of a rolling bearing made of case hardened steel SCR420H is shortened. Therefore, in accordance with SAE8620H and SAE4320H, the chromium content is decreased and other metal elements Ni and Mo are added in order to secure the hardenabilities of SAE8620H and SAE4320H. Thus, the material cost is high. In addition, when the case hardened steels SAE8620H and SAE4320H are subject to carburizing or carbonitriding, crystal grains occasionally grow coarsely, resulting in a source of stress concentration so that the rolling contact fatigue life of the rolling bearing made of case hardened steel SAE8620H or SAE4320H is low.

In addition, other prior-art materials require a high cost in order to produce a long-life rolling bearing because these prior-art materials include expensive Mo, Ni and Cr. The bearing of U.S. Pat. No. 4,023,988 requires a need for a complicated heat treatment, e.g., spheroidizing anneal, rough forming or hardening austenizing, in order to produce a refined carbide. Thus, the productivity of the heat treatment must be decreased.

The bearing of U.S. Pat. No. 4,191,599 includes relatively great amounts of expensive elements Mo, W and Cr and, thus, has a high cost. In addition, a single mechanism of this prior-art producing a residual compressive stress in a surface cannot provide a long-life rolling bearing under lubrication with a foreign matter. That is, causes other than the above-described decrease in the rolling contact fatigue life include a flaking caused by microcracks propagating from a damage or impression in a surface layer of the rolling bearing by foreign matters, e.g., metal chips, shavings, burrs, and abrasion powder mixed with a bearing lubricant, and a nonmetallic inclusion enclosed in the body of the rolling bearing and constituting a source of stress concentration because the nonmetallic inclusion has a high hardness and a low plastic deformability.

The rolling contact fatigue life also decreases because the stress concentration cannot be sufficiently moderated at the site of the nonmetallic inclusion. In addition, none of the above described rolling bearings can sufficiently suppress cracking in dependence on a working ration when they are subject to a preworking, e.g., forging.

SUMMARY OF THE INVENTION

An object of the present invention is to provide a rolling bearing a material cost which will not increase and a producitivity of heat treatment of which is good. Another object is to provide a rollling bearing having a longer life than prior-art rolling bearings even when the rolling bearing is used under not only a clean lubrication but also a lubrication with a foreign matter. Another object is to provide a rolling bearing which experiences no cracking during a preworking, e.g., forging with a high working ratio.

In order to achieve the objects of the present invention, in an inventive rolling bearing comprising an inner ring; an outer ring; and a rolling element, at least one of said inner ring, outer ring and rolling element is made of a medium-carbon manganese steel consisting essentially of C: 0.4 to 0.7 wt. %, Si: 0.15 to 1.2 wt. %, Mn: 1.2 to 1.7 wt. %, Al: 200 to 300 ppm, Ti: below or equal to 40 ppm, N: 100 to 200 ppm, S: below or equal to 80 ppm, O: below or equal to 9 ppm and the balance of Fe. The medium-carbon manganese steel is subject to carburizing or carbo-nitriding to form a surface layer or case of the resulting case-hardened medium-carbon manganese steel including a 25 to 45 vol. % retained austenite.

The medium-carbon manganese steel of the present invention may further include at least one of Bb: 0.03 to 0.08 wt. % and V: 0.1 to 0.15 wt. %.

A rolling bearing of a second aspect of the present invention comprises an inner ring; an outer ring; and a rolling element, in which at least one of said inner ring, outer ring and rolling element is made of a medium-carbon manganese steel consisting essentially of C: 0.4 to 0.7 wt. %, Si: 0.15 to 1.2 wt. %, Mn: 1.2 to 1.7 wt. %, Ti: below or equal to 40 ppm, S: below or equal to 80 ppm, O: below or equal to 9 ppm, at least one of Nb: 0.03 to 0.08 wt. % and V: 0.1 to 0.15 wt. % and the balance of Fe. The medium-carbon manganese steel is subject to carburizing or carbo-nitriding to form a case of the resulting case-hardened medium-carbon manganese steel including a 25 to 45 vol. % retained austenite.

The medium-carbon manganese steel of the rolling bearing of the second aspect of the present invention may include an average crystal grain size number of 8 after the medium-carbon manganese steel is subject to carburizing or carbo-nitriding.

The present invention can provide a rolling bearing having a good heat treatment productivity without increasing material costs because the present invention does not require the expensive metal elements Mo, Ni or Cr nor a need for a long-term complicated heat treatment.

The present invention can provide a rolling bearing having a longer operating life under not only lubrication with foreign matter but also clean lubrication than prior-art rolling bearings because a predetermined amount of the retained austenite is present in the case of the case-hardened medium-carbon manganese steel, the grain growth coarsening during carburizing or carbo-nitriding is prevented, and the amount of a nonmetal inclusion is limited.

The present invention can provide a rolling bearing which will not experience cracking during a preworking, e.g., forging with a high working ratio, because the amount of S is limited.

One embodiment of the present invention can provide a longer life rolling bearing because of a further refining of crystal grains in addition to the above advantages of the present invention.

Another embodiment of the present invention can provide a longer life rolling bearing in addition to the above advantages because the case-hardened medium-carbon manganese steel of the rolling bearing has a crystal microstructure in which the average grain size number is 8 even after the carburizing or carbo-nitriding.

DESCRIPTION OF THE PREFERRED EMBODIMENTS

The inventors have attempted to increase the life of a rolling bearing steel and the preworking cracking and have discovered various relations between an amount of the retained austenite of the surface layer of the rolling bearing steel and the life of the rolling bearing steel, relations between the crystal grain size and the life of the rolling bearing and relations between a sulfur content and a cracking ratio during a preworking. Thus, the inventors have made the present inventions as defined in the attached claims from the above discoveries.

The reasons that the present invention employs the medium-carbon steel with a 0.4 to 0.7 wt. % of C will be described hereinafter.

The inventors have discovered that the 25 to 45 vol. % of the retained austenite of the bearing steel surface layer increased the life of the rolling bearing operating under lubrication with foreign matter. An amount of surface carbon must be increased in order to maintain the amount of the retained austenite of the bearing steel surface layer in the range of the above value. However, a pre-eutectoid harmful to the rolling contact fatigue life tends to easily appear because the contents of Cr of SCR420H and SCH420H are high. As these contents of C are reduced, the hardenabilities of the bearing steels are reduced, so that hardened layer depths required for a rolling bearing cannot be obtained. In accordance with the present invention, when the content of Cr is below 0.35 wt. %, Mn is added in order to prevent the hardenability from being reduced by a reduction in the content of Cr. The medium-carbon manganese steel rich in a base carbon amount is employed in order to suppress an occurrence of the pro-eutectoid, and the amount of the retained austenite of the bearing steel surface layer is in the range of 25 to 45 vol. %, whereby a required hardened layer depth is obtained.

An operation of the retained austenite, which is a characteristic of the present invention, will be described hereinafter with reference to FIGS. 1 through 4.

Figure 2:
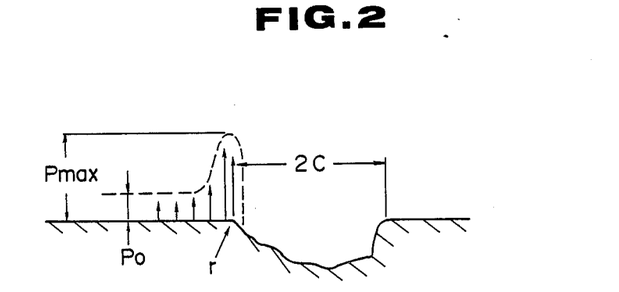
FIG. 2 is a sectional view of an impression with stress distribution being illustrated.

As shown in FIG. 2, when the rolling bearing is used under lubrication with foreign matter, repeated contacts of a surface of each of the inner ring, outer ring and rolling element with the foreign matter produce an impression therein. As understood from a sectional view of the impression shown in FIG. 2, the impression has an edge receiving the maximal stress Pmax. The radius of curvature of the edge and the radius of the impression have close relations with the presence of the retained austenite as described hereinafter. Normally, the retained austenite is soft and, for example, has a Hv 300 hardness (however, this is changable depending on the content of carbon of a material). Therefore, when the retained austenite is present in the case at a desired ratio, a stress concentration at the edge of the impression can be moderated, so that the propagation of a microcrack occurring in the impression after the impression occurs can be retarded. The retained austenite in the case is transformed into a martensite and hardened by a transformation energy applied to a surface of the case once the number of relative passes of a mating element (e.g., bearing rings relative to the rolling element) passing past the impression during a rolling of the rolling element exceeds a predetermined value.

Figure 3:
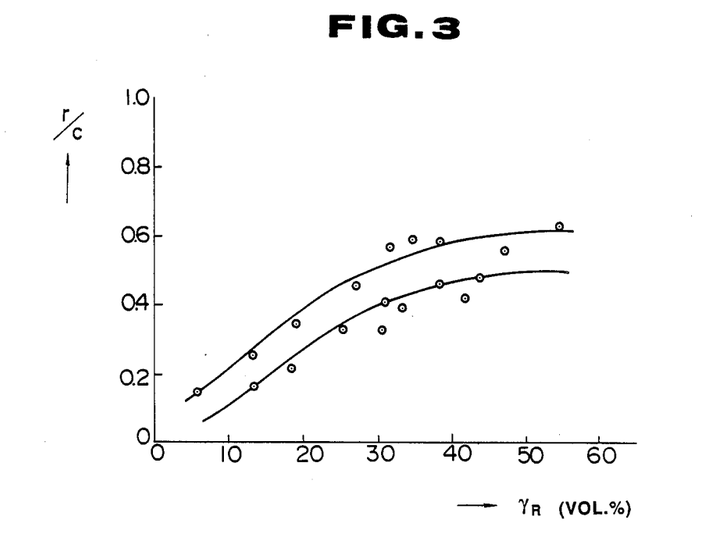
FIG. 3 is a graph illustrating the relation between the value r/c and an amount $\gamma_R$, the graph illustrating that the value r/c is saturated relative to the amount $\gamma_R$.

FIG. 3 illustrates a relation between an r/C value and an amount $\gamma_R$ of the retained austenite.

In order to reduce the rate Pmax/Po (i.e., moderate the stress concentration), the radius of curvature r had to be increased when the radius c of the impression is fixed. That is, the value r/c is a factor reflecting a degree of moderation of the stress concentration. Increasing this value increases the life of the rolling bearing. However, as shown in FIG. 3, even when the ratio of the amount $\gamma_R$ of the retained austenite is increased, the value r/C is saturated at the predetermined level and will not increase beyond a fixed value. In particular, when the amount $\gamma_R$ of the retained austenite is equal to or above 45 vol. %, this saturation is prominent so that the value r/C is essentially saturated. Therefore, even if the amount $\gamma_R$ of the retained austenite is equal to or above 45 vol. %, the surface hardness is caused to decrease, so that the rolling contact fatigue life is shortened.

Critical significances of the numerical limitations of the present invention defined in the accompanying claims will be described hereinafter.

Figure 1:
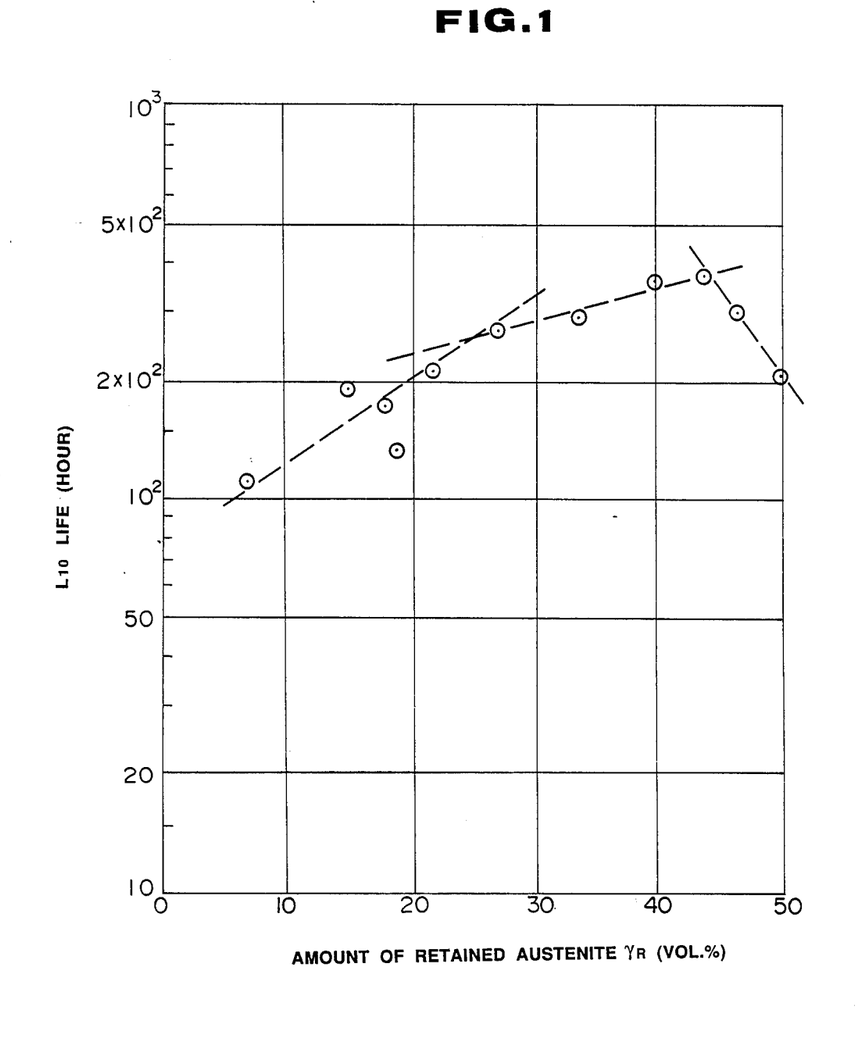
FIG. 1 is a graph illustrating the relation between rolling contact fatigue life under lubrication with a foreign matter and the amount of retained austenite.

An apparent from the relation between the life of the rolling bearing and the amount $\gamma_R$ (vol. %) of the retained austenite illustrated in FIG. 1, the life of each of the inner ring, outer ring and rolling element operating under lubrication with foreign matter, i.e., a rolling contact fatigue life $L_{10}$ defined by an elapsed time up to flaking changes in response to a change in the amount $\gamma_R$ of the retained austenite.

That is, when the amount $\gamma_R$ of the retained austenite is equal to or above 25 vol. %, the rolling contact fatigue life $L_{10}$ increases and, on the other hand, when the amount $\gamma_R$ of the retained austenite is above 45 vol. %, the rolling contact fatigue life $L_{10}$ rapidly decreases. Therefore, the amount $\gamma_R$ of the retained ausenite of the surface layer of each of the inner ring, outer ring and rolling element has to be in the range of at least 25 to 45 vol. %.

In particular, an amount $\gamma_R$ of retained austenite above 45 vol. % is not preferable because the surface hardness of each of the inner ring, the outer ring and the rolling element decreases after carburizing or carbo-nitriding.

In order to secure the life equal to or above that of a prior-art rolling bearing made of a cemented steel, the HRC of the rolling element is preferably equal to or above 63 and the HRCs of the inner and outer rings are preferably equal to or above 58. In order to achieve this state, the amount $\gamma_R$ of the retained austenite has to be below or equal to 45 vol. %.

The experimental conditions of FIG. 1 are as follows: A ball bearing life testing machine made by Nippon Seiko K. K. was employed, and a lubricant including a turbine oil (FBK oil RO 68 made by NIPPON OIL CO., LTD.) and 10 ppm steel power (hardness: Hv 300 to 500, grain size: 80 to 160 μm) was employed and the test rolling bearing was tested under a 600 kgf bearing load (radial load) at 2,000 rpm bearing rotation speed.

The operation of included elements of the medium-carbon steel employed in the present invention and the critical significances of the contents of the elements will now be described.

Al

Al forms an oxide-system nonmetallic inclusion, e.g., $Al_2O_3$. The hardness of $Al_2O_3$ is high and the plastic deformability of $Al_2O_3$ is low, so that $Al_2O_3$ provides a source of stress concentrations and causes the rolling contact fatigue life to decrease. Therefore, a content of Al had to be reduced in order to increase the life of the rolling bearing. On the other hand, Al had to be precipitated in the form of AlN in a grain boundary in order to prevent a crystal grain from coarsely growing during carburizing or carbo-nitriding.

In accordance with the present invention, the content of Al is 200 to 300 ppm. When the content of Al is below 200 ppm, the crystal grain grows coarsely, so that the rolling contact fatigue life is shortened. On the other hand, when the content of Al is above 300 ppm, an amount of $Al_2O_3$ increases and adversely affects the life of the rolling bearing.

Ti

Ti appears as a nonmetal inclusion in the form of TiN. The hardness of TiN is high and the plastic deformability of TiN is low, so that TiN provides a source of stress concentration and is harmful to the rolling contact fatigue life. Therefore, the content of Ti had to be reduced as greatly as possible and the upper limit of the content of Ti is 40 ppm.

N

N is required in order to form AlN and suppress the crystal grain from coarsely growing. However, when the content of N was high, the amount of TiN constituting a nonmetallic inclusion was high. Therefore, in accordance with the present invention the content of N is 100 to 200 ppm. When the content of N is below 100 ppm, a precipitation amount of AlN is insufficient, so that the crystal grain coarsely grows. On the other hand, when the content of N is above 200 ppm, the amount of Tin is high, so that the rolling contact fatigue life is shortened.

S

S is a cause producing a sulfide-system nonmetallic inclusion, e.g., MnS. The hardness of MnS is low and the plastic deformability of MnS is high, so that MnS operates as a starting point of cracking in at least one of the inner ring, outer ring and rolling element during a preworking, e.g., forging and rolling. Therefore, in order to prevent cracking during the preworking and to allow a harder working, a content of S had to be reduced. Thus the upper limit of the content of S is 80 ppm.

O

Since O reduces the rolling contact fatigue life as an oxide-system nonmetallic inclusion producing element, the content of O has to be reduced as greatly as posssible. Thus the upper limit of the content of O is 9 ppm.

Si

Si is required as a deoxidizer, so that the content of Si is 0.15 to 1.2 wt. %. When the content of Si is below 0.15 wt. % the deoxidation effect is insufficient. On the other hand, even when the content of Si is above 1.2 wt. %, the deoxidation effect is constant. Thus the content of Si is in the above range.

Mn

Mn is required in order to compensate for a reduction in hardenability due to a reduction in the content of Cr. Thus, the content of Mn is 1.2 to 1.7 wt. %. When the content of Mn is below 1.2 wt. %, the hardenability of the rolling bearing steel could not be improved. On the other hand, when the content of Mn is above 1.7 wt. %, the hardness of the rolling bearing steel increases and the forgability or machinability of the rolling bearing steel were reduced.

Nb, V

Nb and V are effective elements in order to precipitate in a grain boundary in themselves, to suppress the grain boundary from coarsely growing and to refine crystal grains of the grain boundary so that the life of the rolling bearing is increased. Nb and V also are effective in reinforcing a grain growth coarsening preventing operation of AlN.

That is, when a high-temperature heat treatment (at a temperature of 950° to 970° C.) or a long-term heat treatment is carried out in order to shorten the carburizing time or carbo-nitriding time, single AlN could not sufficiently prevent the crystal grain from coarsely growing. Therefore, in accordance with the invention, at least one of Nb: 0.03 to 0.08 wt. % and V: 0.1 to 0.15 wt. % was added to the medium-carbon manganese steel.

Alternatively, in accordance with the invention, at least one of Nb: 0.03 to 0.08 wt. % and V: 0.1 to 1.5 wt. % instead of Al and N is added to the medium-carbon manganese steel in order to prevent the crystal grain from coarsely growing.

When the content of Nb is below 0.03 wt. % and the content of V is below 0.1 wt. %, the effect of preventing the crystal grain from coarsely growing is low. On the other hand, even when the content of Nb is above 0.08 wt. % and the content of V is above 0.15 wt. %, the effect of preventing the crystal grain from coarsely growing increases and the cost is high.

A critical significance of the value of a base carbon of a carbon steel employed in the present invention will now be described.

When the ratio of the base carbon is below 0.4 wt. %, the carburizing time or carbo-nitriding time increases and the productivity of heat treatment decreases. A medium-carbon manganese steel employed in the present invention is of a type not containing an element, e.g. Cr or Mo, increasing the hardenability. When the amount of the base carbon is below 0.4 wt. %, the hardenability is insufficient so that a sufficient hardening depth can not be obtained.

On the other hand, when the amount of the base carbon is above 0.7 wt. %, the amount of carbon infiltrating due to carburizing is low and a ratio or carbon infiltrating due to carburizing is low and a ratio of carbon infiltrating a matrix and forming a solid solution with the matrix is low, so that a heterogeneous solid solution appears and the rolling contact fatigue life is shortened. Therefore, the amount of the base carbon is selected to be in the range of 0.4 to 0.7 wt. %.

Figure 4:
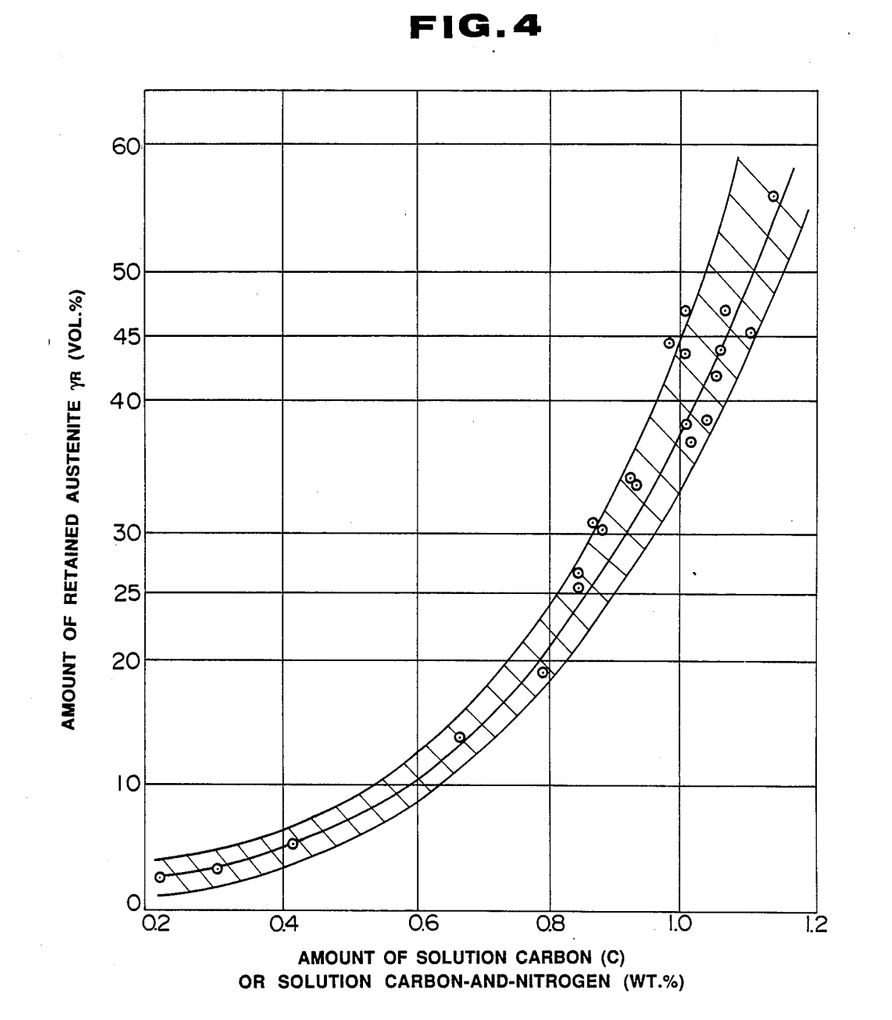
FIG. 4 is a graph illustrating the relation between the amount of solution carbon C or solution carbon-and-nitrogen C+N and the amount $\gamma_R$ of retained austenite.

As shown in FIG. 4, when the carbon steel with the amount of the base carbon in the above range was subject to carburizing or carbo-nitriding so that an amount of a solution carbon or solution carbon-and-nitrogen was adjusted to be in the range of 0.8 to 1.1 wt. %, the amount of the retained austenite could fall within the range of 25 to 45 vol. %. When the carbon steel with the amount of the base carbon in the above range is subject to carburizing or carbo-nitriding, carbon atoms and nitrogen atoms uniformly diffuse between Fe atoms and form a solid solution with the Fe atoms to reinforce the carbon steel, so that an occurrence of a microcrack at a position at which the maximal shearing stress occurs could be retarded and the rolling contact fatigue life increased under not only lubrication with foreign matter but also clean lubrication.

As defined in claim 4, the grain size of the medium-carbon steel forming the rolling bearing is refined to be equal to or above 8 in terms of grain size number even after carburizing or carbo-nitriding, so that a long-life rolling bearing can be provided.

EMBODIMENT

The preferred embodiment of the present invention will now be described.

Samples of a prior-art carbon steel SMN443 in which contents of Al, S and N are dissolved to provide test piece materials. The following Tabel 1 shows the composition of each test piece material.

TABLE 1

| Test Piece Material No. | C | Si | Mn | S | Al | Ti | N | O | Nb | V |
|---|---|---|---|---|---|---|---|---|---|---|
| 1 | 0.42 | 0.25 | 1.52 | 70 | 220 | 40 | 140 | 9 | — | — |
| 2 | 0.43 | 0.26 | 1.48 | 150 | 60 | 40 | 50 | 8 | — | — |
| 3 | 0.43 | 0.25 | 1.47 | 180 | 250 | 30 | 160 | 8 | — | — |
| 4 | 0.41 | 0.27 | 1.47 | 110 | 170 | 20 | 120 | 7 | — | — |
| 5 | 0.42 | 0.23 | 1.51 | 50 | 230 | 20 | 70 | 9 | — | — |
| 6 | 0.40 | 0.21 | 1.50 | 140 | 240 | 20 | 130 | 7 | 0.05 | — |
| 7 | 0.41 | 0.22 | 1.48 | 60 | 240 | 30 | 140 | 7 | — | 0.1 |
| 8 | 0.41 | 0.19 | 1.45 | 40 | 150 | 40 | 70 | 9 | 0.07 | — |
| 9 | 0.45 | 0.23 | 1.60 | 60 | 350 | 20 | 110 | 7 | — | — |
| 10 | 0.44 | 0.28 | 1.50 | 60 | 250 | 30 | 130 | 8 | 0.1 | 0.21 |
| 11 | 0.44 | 0.21 | 1.45 | 70 | 270 | 30 | 150 | 8 | 0.01 | 0.07 |

<Contents of S, Al, Ti, N and O are expressed in terms of ppm, the others are expressed in terms of wt. %.>

Next, a plurality of test piece materials listed in Table 1 are subject to a 930° C.×8 hr heat treatment and the grain size was examined. Table 2 shows the results of this examination.

TABLE 2

| Test piece material No. | Grain size number | Average grain size number | Bearing life $L_{10} \times (10^6)$ | Cracking ratio (%) |
|---|---|---|---|---|
| 1 | 7–10 | 9 | 12 | 0 |
| 2 | 1–10 | 4 | 5 | 70 |
| 3 | 8–10 | 9.5 | 17 | 100 |
| 4 | 5–10 | 6 | 8.5 | 20 |
| 5 | 6–9 | 7 | 9.5 | 0 |
| 6 | 10–12 | 10.5 | 24 | 80 |
| 7 | 10–12 | 11 | 20 | 0 |
| 8 | 9–11 | 10 | 19 | 0 |
| 9 | 8–10 | 9.5 | 7.4 | 0 |
| 10 | 10–12 | 10.5 | 21 | 0 |
| 11 | 8–10 | 9 | 15 | 0 |

Rolling Contact Fatigue Life Test

Each test piece material listed in Table 1 was subject to carburizing or carbo-nitriding and test pieces in which an amount of the retained austenite was adjusted to be 25 to 45 vol. % were prepared.

Figure 5:
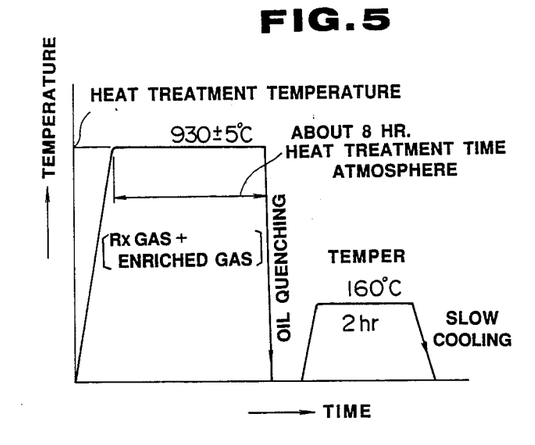
FIG. 5 is a graph illustrating the relation between temperature and the time of carburizing plus direct quenching.
Figure 6:
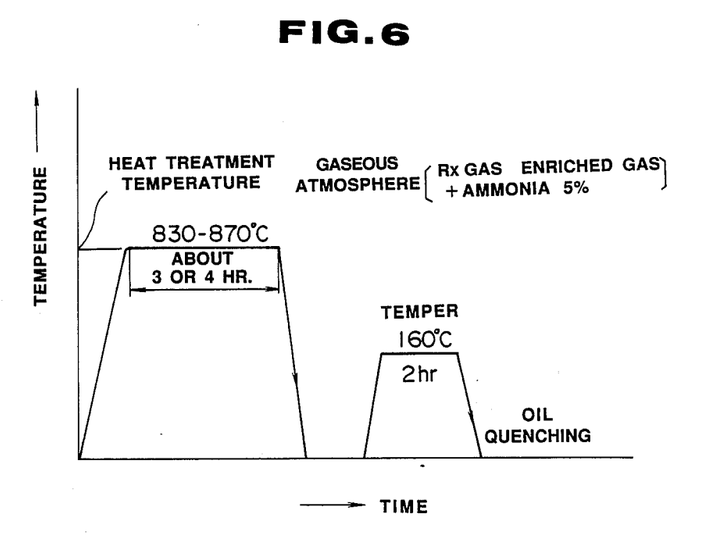
FIG. 6 is a graph similar to FIG. 5 and illustrating the relation between temperature and the time of carbo-nitriding.

Conditions of heat treatment for the present embodiment will now be described. As shown by the graph of FIG. 5, a direct quenching immediately after carburizing was carried out under an atmosphere of an Rx gas plus an enriched gas at 930° C.±5° C. for about 8 hours and then temper was carried out at 160° C. for 2 hours. As shown by in the graph of FIG. 6, a carbo-nitriding was carried out under an atmosphere of an Rx gas plus an enriched gas plus 5% ammonia at 830° to 870° C. for about 3 to 4 hours. Then an oil quenching was carried out.

Disc-shaped test pieces applicable to both the inner and outer rings of the rolling bearing were made of test pieces subject to the above carburizing or carbo-nitriding. A rolling contact fatigue life test on each disc-shaped test piece ws carried out by means of a testing machine disclosed on "page 10 to 21, Special Steel Mannual (First eddition)" edited by Electrosteelmaking Research Institute, published by Rikohgakusha, May 25, 1965.

Figure 7:
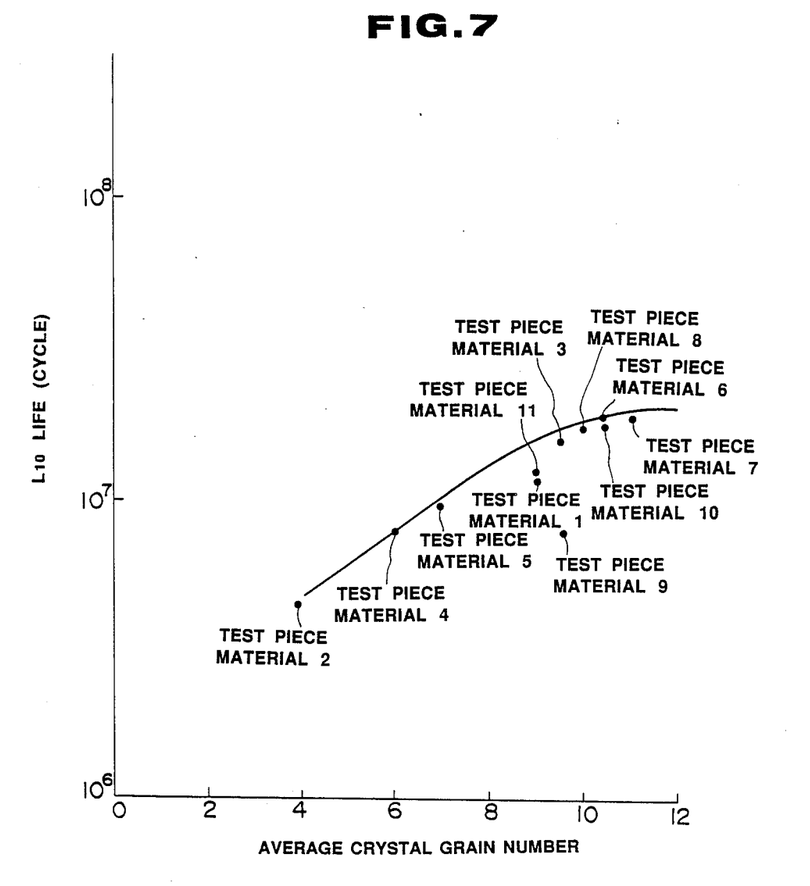
FIG. 7 is a graph illustrating the relation between average grain size number and bearing life $L_{10}$.

Conditions of this test are as follows:
Pmax=560 kgf/mm$^2$, N=3000 c.p.m.
Lubricating oil #68 turbine oil Table 2 and FIG. 7 show the results of this rolling contact fatigue life. FIG. 7 illustrates the relation between an average crystal grain size number of each test piece material and a bearing life $L_{10}$ as defined by the number of stress cycles caused by rolling. As understood from FIG. 7, as the average grain size number, i.e., grain size, decreases, the value $L_{10}$ increases, so that the rolling contact fatigue life increases.

The contents of Al and N in test piece material No. 2 are low, the content of Al in test piece material No. 4 is low and the content of N in test piece material No. 5 is low, so that the values $L_{10}$ of test piece materials Nos. 2, 4 and 5 are low. On the other hand, the contents of Al and N in test pieces Nos. 1 and 3 are in the inventive range, so that the values $L_{10}$ of test piece materials Nos. 1 and 3 are good.

Cracking Test

Figure 8:
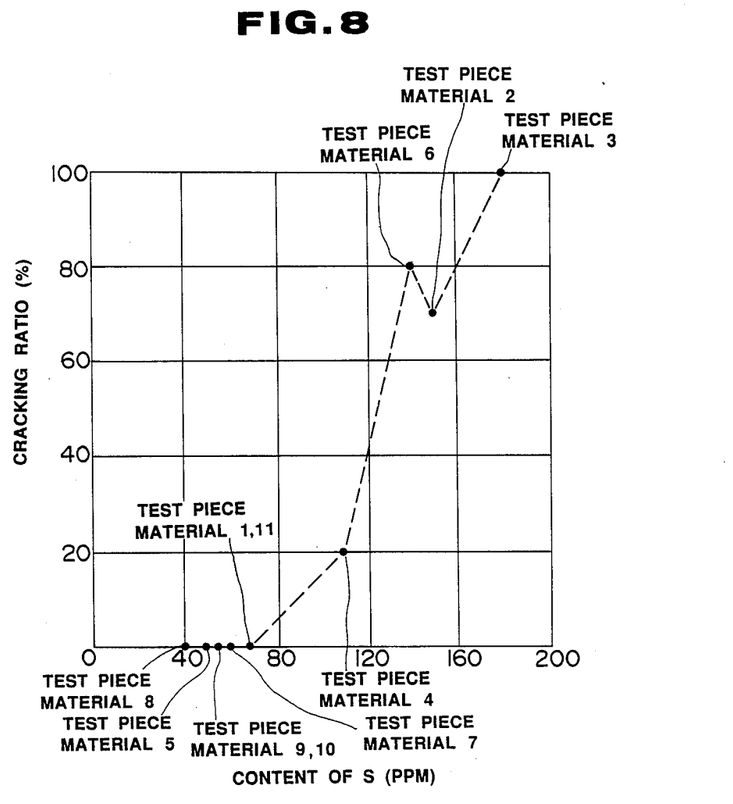
FIG. 8 is a graph illustrating the relation between the content of S and the cracking ratio.

Cylindrical test pieces of 20×30 mm were made of the test piece materials listed in Table 2 and subject to cold working (i.e., cold forging) at a 80 % upsetting ratio. Cracking ratios were checked. Ten cylindrical test pieces were made of each of the above test piece materials. Table 2 and FIG. 8 illustrate the results of the test on the cracking ratios. FIG. 8 is a graph representing the relation between the content of S in each test piece material and a cracking ratio.

As shown in Table 2, the content of S in each of test piece materials Nos. 2, 3, 4 and 6 is great, so that test piece materials Nos. 2, 3, 4 and 6 experienced cracking. In particular, each of the test piece materials Nos. 3 and 6 has a small grain size and a great value $L_{10}$, however, cracking could not be avoided because the contents of S in test piece materials Nos. 3 and 6 were great as described above.

FIG. 8 teaches that when the contents of S in test piece materials are low, cracking ratios are low and in particular, the cracking ratio is zero when the content of S is below or equal to 80 ppm. Therefore, when the content of S is below or equal to 80 ppm, a harder working could be carried out.

The rolling contact fatigue life test of the above embodiment showed lives of disc-shaped test pieces applicable to both the inner and outer rings of the rolling bearing. Likewise, similar results of the same rolling contact fatigue life test as above-described were obtained even when the rolling element of the rolling bearing was made of the same material as the inner and outer rings of the rolling bearing.

What is claimed is:

1. A rolling bearing, comprising: an inner ring; an outer ring; and a rolling element, at least one of said inner ring, outer ring and rolling element being made of a medium-carbon manganese steel consisting essentially of C: 0.4 to 0.7 wt. %, Si: 0.15 to 1.2 wt. %, Mn: 1.2 to 1.7 wt. %, Al: 200 to 300 ppm, Ti: below or equal to 40 ppm, N:100 to 200 ppm, S: below or equal to 80 ppm, O: below or equal to 9 ppm and the balance of Fe, the medium-carbon manganese steel having been subjected to one of carburizing or carbo-nitriding such that a case of the resulting case-hardened medium-carbon manganese steel includes 25 to 45 vol. % retained austenite.

2. The rolling bearing as defined in claim 1, wherein the medium-carbon manganese steel further consists essentially of at least one of Nb: 0.03 to 0.08 wt. % and V: 0.1 to 0.15 wt. %.

3. A rolling bearing, comprising: an inner ring; an outer ring; and a rolling element, at least one of said inner ring, outer ring and rolling element being made of a medium-carbon manganese steel consisting essentially of C: 0.4 to 0.7 wt. %, Si: 0.15 to 1.2 wt. %, Mn: 1.2 to 1.7 wt. %, Ti: below or equal to 40 ppm, S: below or equal to 80 ppm, O: below or equal to 9 ppm, at least one of Nb: 0.03 to 0.08 wt. % and V: 0.1 to 0.15 wt. %, and the balance of Fe, the medium-carbon manganese steel having been subjected to one of carburizing or carbo-nitriding such that a case of the resulting case-hardened medium-carbon manganese steel includes 25 to 45 vol. % retained austenite.

4. The rolling bearing as defined in claim 1, wherein the medium-carbon manganese steel has the average crystal grain size number of 8 after the medium-carbon manganese steel is subject to one of carburizing or carbo-nitriding.

5. The rolling bearing as defined in claim 2, wherein the medium-carbon manganese steel has the average crystal grain size number of 8 after the medium-carbon manganese steel is subject to one of carburizing or carbo-nitriding.

6. The rolling bearing as defined in claim 3, wherein the medium-carbon manganese steel has the average crystal grain size number of 8 after the medium-carbon manganese steel is subject to one of carburizing or carbo-nitriding.

* * * * *